No. 851,940. PATENTED APR. 30, 1907.
J. A. KAPLAN.
PULLEY.
APPLICATION FILED JAN. 25, 1906.
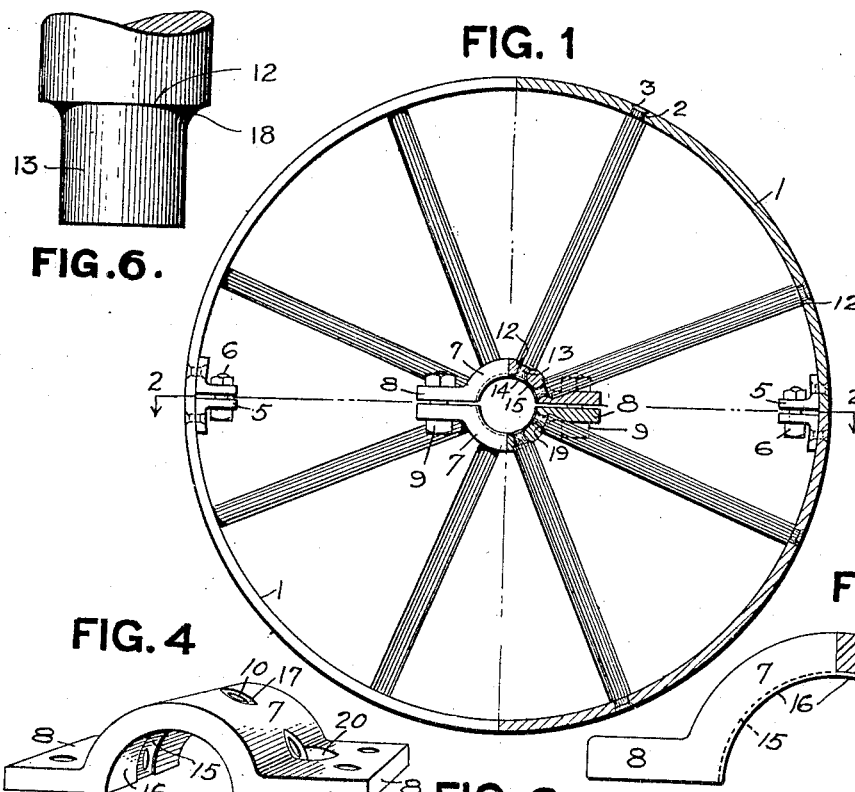
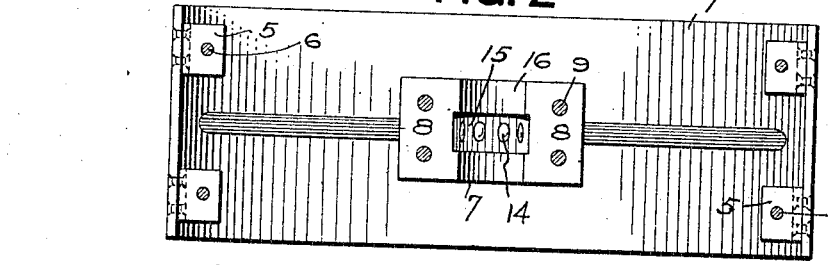
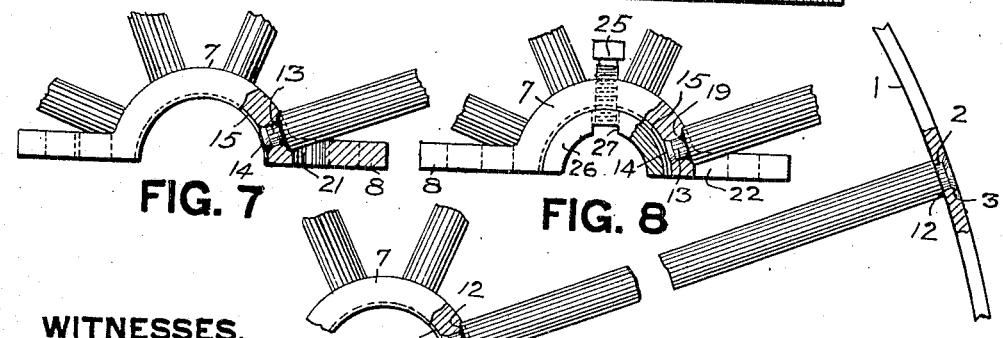
WITNESSES.
INVENTOR.

UNITED STATES PATENT OFFICE.

JOSEPH A. KAPLAN, OF PITTSBURG, PENNSYLVANIA, ASSIGNOR TO JOSHUA RHODES, OF ALLEGHENY, AND WILLIAM H. LATSHAW, OF PITTSBURG, PENNSYLVANIA.

PULLEY.

No. 851,940.  Specification of Letters Patent.  Patented April 30, 1907.

Application filed January 25, 1906. Serial No. 297,846.

*To all whom it may concern:*

Be it known that I, JOSEPH A. KAPLAN, a resident of Pittsburg, in the county of Allegheny and State of Pennsylvania, have invented a new and useful Improvement in Pulleys; and I do hereby declare the following to be a full, clear, and exact description thereof.

This invention relates to pulleys and more especially to sectional pulleys constructed entirely of wrought metal.

The object of the invention is to provide a pulley which is very light, strong and true and which can be quickly and cheaply manufactured.

The invention consists in details of construction hereinafter described and claimed.

In the accompanying drawings Figure 1 is in part a side view and in part is a sectional view of a pulley constructed according to my invention; Fig. 2 is a sectional view thereof on the line 2—2, Fig. 1; Fig. 3 is an enlarged detail sectional view showing the manner of connecting the spokes to the rim and hub; Fig. 4 is a perspective view of a hub section; Fig. 5 is a sectional view of the hub; Fig. 6 is a side view of a spoke, showing the same on an enlarged scale; and Figs. 7 and 8 are detailed views partly in section showing modifications of the hub sections.

The pulley illustrated is constructed in two similar sections, although if desired the principle may be applied to a pulley having three or even four sections. The rim consists of two similar sections 1 of plate metal bent into semi-circular form and provided with spoke holes 2 counter-sunk on the outer face as shown at 3 and having riveted to their ends angle brackets or ears 5 which project inwardly as shown and which are provided with holes for receiving bolts 6 or other suitable connecting means.

The hub sections 7 are formed by forging metal practically to semi-tubular shape with edge portions 8 projecting outwardly so as to form radial ears which are provided with holes or the like for receiving bolts 9 or other suitable connecting means. These hub sections are provided with spoke holes 10 counter-sunk on the inner face as at 11 for receiving the inner ends of the spokes.

The spokes are formed of suitable metal bars or rods provided with shoulders 12 at their ends for seating against the inner face of the rim and outer face of the hub, and with projecting tenons 13 which are inserted in the spoke holes in the rim and hub and upset therein. The upsetting of the inner ends of the spokes forms a slight head 14 projecting into the bore of the hub so that if placed directly on a shaft the pulley would bear only on these projecting portions and consequently would wabble on the shaft. To prevent this I provide the hub on its inner face with a circular depression or groove 15 which is of sufficient depth so that the heads 14 will not project beyond the same. Consequently the pulley has a bearing on the shaft or bushing only at the end portions 16 and cannot wabble. The groove 15 has the further advantage that should the shaft itself have any inequalities the pulley will nevertheless bear on the shaft only at the end portions 16.

The shoulders and tenons are formed on the spokes, preferably by turning down the ends thereof in a suitable lathe. The shoulders 12 must be formed very accurately as the trueness or concentricity of the pulley depends upon the accuracy of the distance between the shoulders 12 at the two ends of the spokes. These shoulders 12 also give a strong bearing against the rim and hub so that the pulley is enabled to withstand very heavy pressures. In order that the strength may be maximum the outer face of the hub will be flattened around the spoke holes, such as turning down seats 17 which are flat and therefore form a bearing for the shoulders on the inner ends of the spokes. These seats are turned down so all of them are the same distance from the axis of the hub, this also aiding in producing a thoroughly concentric pulley.

In turning down the end of the spoke to form the tenon to enter the hub the formation of a sharp angle between the shoulder 12 and tenon 13 is likely to leave a scratch or nick in the angle and as a consequence there is liability of the tenon shearing off under severe strain. To prevent this the ends of the spokes are so shaped that the shoulder 12 is joined to the tenon 13 by means of a fillet or curved portion 18 which entirely overcomes the tendency to shear off due to a sharp angle or a slight cutting into the metal at that point, and increases the strength of the tenon many times in proportion to the added metal of the fillet itself. The spoke holes in the hub are reamed out, as shown at 19, so as to conform in shape to this fillet.

When the pulley is provided with a sufficient number of spokes to give great strength some of the spokes come so near to the ears 8 on the hub sections that there is not room for the shoulders 12. To provide for this the hub sections have suitable depressions or clearances to make room for the shoulders on the spokes. These may be formed by suitable projections on the forging dies which press depressions 20 into the outer face of the hub section at the base of the ears 8. The same result may be obtained by cutting away the metal of the hub at this point either to form a hole, as shown at 21, Fig. 7, or by forming an opening out to the end of the ears 8 as shown at 22, Fig. 8. The latter method, however, is not desirable as it unnecessarily weakens the hub sections. The hub sections are also of sufficient thickness to have tapped therethrough a set screw 25 for clamping the same directly on the shaft if desired. These hub sections furthermore are adapted for receiving the ordinary bushings 26 so that a pulley may be applied to various sizes of shafts. These bushings may have a keyway 27, and the screw 25 may be located to project into said keyway, as shown.

The two pulley sections are identical in construction and are united by means of the bolts 6 and 9 so that the pulley can be readily placed upon or removed from the shaft without disturbing the hangers or couplings. The entire pulley is made from wrought metal, the hub sections being forgings, the rim sections being rolled plates bent to shape, the spokes being rolled bars, and the ears or brackets 5 being formed of suitable punched and bent up pieces of wrought metal. The pulley possesses the maximum amount of strength for weight thereon. All the parts thereof can be quickly and cheaply made and with such accuracy that the finished pulley is practically mathematically concentric. The formation of the spokes in the manner described with shoulders and tenons secures great accuracy in concentricity. The joining of the shoulders 12 to tenons 13 by means of a fillet or curved portion overcomes any weakness at this point which might result from the formation of a sharp angle. The provision of a groove on the inner face of the hub sections does away with the necessity of finishing the inner upset ends of the spokes other than is done by the riveting hammer. At the same time it gives a bearing for the hub at its end portions only, so that the pulley will not wabble on the shaft even though the upset inner ends of the spokes should be of considerable height, or the shaft itself should be irregular in shape.

What I claim is:

1. A metal wheel provided with a hub, rim, and connected spokes, said hub having spoke-receiving openings provided with flaring outer ends, said spokes having reduced end portions fitting in said openings and riveted therein, and having shoulders resting on the outer face of the hub and curved portions connecting said shoulders and reduced end portions and contained in the flaring outer ends of the openings in the hub.

2. A metal wheel provided with a hub, rim, and connecting spokes, said hub having spoke-receiving openings provided with flaring outer ends and with seats surrounding the same, said spokes having reduced end portions fitting in said openings and riveted therein, and having shoulders resting against the seats on the hub with curved portions connecting said shoulders and reduced end portions and contained in the flaring outer ends of the openings in the hub.

3. A sectional metal wheel comprising a partible hub and rim, and spokes connecting the same, said partible hub having spokes holes provided with flaring outer ends and being provided with a circular groove in its inner face with which the spoke holes communicate, said spokes having shoulders resting against the outer face of the hub and having reduced end portions projecting through the spoke holes and upset on the inner face of the hub with the upset ends lying in said circular groove, the shoulders on the spokes being joined to the end portions by means of fillets or curved portions.

In testimony whereof, I the said JOSEPH A. KAPLAN have hereunto set my hand.

JOSEPH A. KAPLAN.

Witnesses:
ROBERT C. TOTTEN,
G. C. RAYMOND.